May 6, 1958     P. D. DE LASZLO     2,833,682
REINFORCED STRUCTURES
Filed Nov. 30, 1953
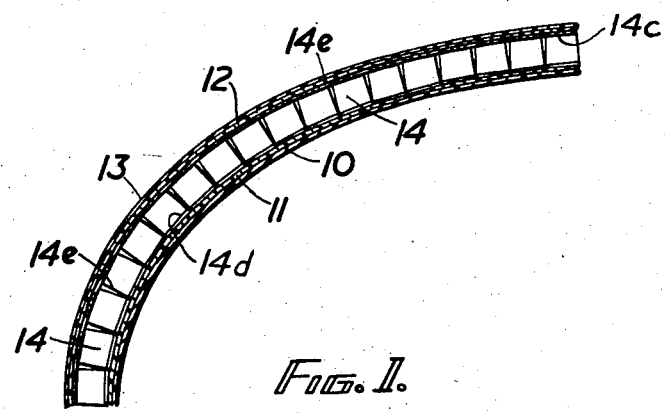
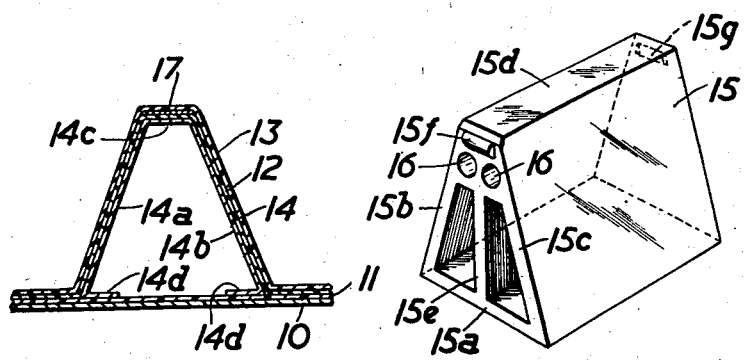
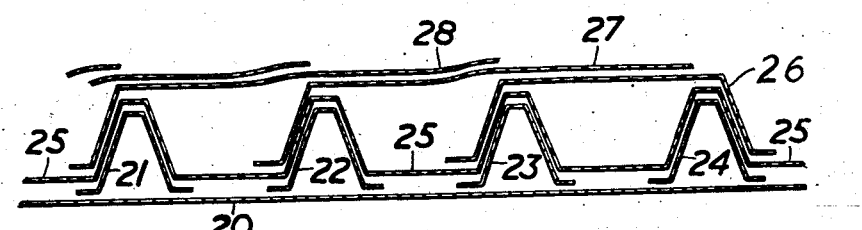
INVENTOR
Patrick D. De Laszlo
BY
Holcombe, Wetherill + Brisebois    ATTORNEYS

United States Patent Office 2,833,682
Patented May 6, 1958

2,833,682

REINFORCED STRUCTURES

Patrick David de Laszlo, London, England

Application November 30, 1953, Serial No. 395,245

2 Claims. (Cl. 154—45.9)

This invention relates to reinforced structures and is particularly concerned with reinforced structures made from resin-impregnated fabric woven of glass fibres.

A light and strong sheet material can be formed by taking a fabric composed of glass fibres and applying to it a hardenable synthetic resin. If an appropriate resin is used, the resulting sheet is very light for its strength, and since the fabric can be shaped before the resin is applied and hardened, the process lends itself to the production of curved surfaces.

In using this process for making certain bodies and specifically a body such as a boat hull, while the adequate surface strength, in the sense of resistance to penetration, can be obtained with relatively thin sheets of the processed material, the thinness results in reduced torsional strength of the body as a whole. It is not practicable to increase torsional strength by the mere increase of thickness, since a point is rapidly reached where the stiffness/weight ratio equals that of a conventional construction, and thereafter the conventional construction is better in this respect.

On the other hand, in the case of a curved surface such as a boat hull, or other curviform article having a surface curved in two planes, any reinforcing members must be shaped accurately if they are to follow the contours of the surface, and a large number of differently shaped members are required. The provision and fitting of these members becomes a major problem.

In accordance with the invention a layer or layers of the fabric is shaped and the resin applied and hardened; a further layer or layers of the fabric is or are applied in a shape to provide reinforcement and resin is applied to the further layers and hardened. Preferably there is used a form over which the reinforcing layer is shaped, and when this reinforcing fabric layer is applied it is arranged to cover the form and engage the base layer on both sides of the form. In some cases, by using a form of a material to which the resin will not adhere such as polystyrene, the form can be subsequently withdrawn.

By means of the invention it becomes possible to provide a reinforcement at any desired part of the hull or the like, and of any requisite strength, within wide limits.

The reinforcement has the same facility of manipulation, and advantage of strength, as the hull with which it becomes integrally formed.

The form can be channel-section, such as inverted-V, and in order to permit it to be applied to a surface which is curved in two planes, the sides of the channel can be split.

By using a reinforcing member which is rib-like, it becomes possible to use a second layer which engages and bridges the tops of the ribs, thus forming a double-skinned construction. For boats and like hulls this affords very good surface strength and also good torsional strength.

The invention will be more readily understood by way of example from the following description of the construction of a boat hull or the like, in conjunction with the accompanying drawing, in which:

Figure 1 is a fragmentary cross-section through a curved reinforced structure, such as a portion of a boat hull, made in accordance with the invention;

Figure 2 is a fragmentary cross-section through the construction of Figure 1, showing the shape of the form used;

Figure 3 is a perspective view of an alternative type of form, and

Figure 4 is a diagram showing one manner of building up a double-skin construction in accordance with the invention.

The hull is made from layers 10, 11 of glass-fibre fabric impregnated with a synthetic resin, conveniently of the cold curing type, reinforced by layers 12, 13 of the same material each shaped over a V-section channel form 14. The forms 14 are made from any light and moderately stiff material, for example aluminum, polythene sheet or leatheroid. The form shown in Figures 1 and 2 is composed of thin sheet material such as aluminium bent to provide inclined sides 14a, 14b, and a flat top 14c, and also inturned feet 14d. The channel thus formed is articulated by being slit at 14e at regular intervals along the length of the channel; these slits are relatively wide and extend from the edge of the channel, including the feet 14d, to the top 14c leaving the latter unsevered so that the channel can be bent or twisted to follow a surface curved in two planes, the individual sections aligning with each other to form a hollow rib as shown in Figure 1.

Figure 3 shows an alternative shape of reinforcing form. In this case, the form is composed of a series of elements which are secured together to provide a continuous but articulated line. With the type shown in Figure 3, the individual elements are identical, and each consists of a moulding of a suitable material such as thermoplastic or thermosetting resin, or a light alloy diecasting. The element 15 has a flat base 15a, two upwardly and inwardly sloping straight side walls 15b, 15c, joined by a narrow flat top 15d. In this case, the angle between each side and the base is about 70°. In addition to the side walls and the base, there is provided a central vertical wall 15e, extending from the base to the top of the moulding. As thus far described, the moulding is a regular prism and the ends are open.

Two holes 16, located near the top of the moulding, run lengthwise through it, and at the top of one end face is formed a small projection 15f, while a corresponding recess 15g is formed in the other end face.

In use a series of these mouldings is placed on a flat surface, with the mouldings end to end in line. In this position the projections and recesses engage and locate the adjacent mouldings. The line of moulding is then secured together by a length of adhesive tape applied along the top or by threading a nylon or like thread through the now registering holes 16. When thus secured together there is produced an articulated member which can be applied to a curved surface, so as to conform to it.

In constructing the hull or the like, a female former, shaped to conform to the external shape desired for the body, is covered with a sheet of the glass-fibre fabric, or with overlapping sheets of the fabric. At this stage the sheets are completely flexible. The resin is then applied, and when the resin is slightly tacky further layers of fabric and resin can be applied.

The articulated reinforcing forms are laid at intervals on this fabric layer athwartwise the body, being suitably bent to follow the curvature of the sheets as desired. Over each form is laid a sheet of fabric so that it covers closely the form and at least part of the surface of the first layer exposed between the forms. Resin is then applied to these last layers. It is also possible to use a braided or woven tape 17 of nylon or the like, or a similar initial strip, to give further strength to the reinforcement.

The construction also lends itself to the production of a double-skin hull, for example in the manner shown diagrammatically in Figure 4. In this case a base layer 20, corresponding to base layer 10, is laid upon a suitable mould surface, and a series of articulated forms 21, 22, 23, 24 laid at appropriate intervals upon it. One more or less continuous sheet 25 of the fabric is laid over all the forms, or a series of strips can be used, and the resin is applied. The vertices of the reinforcing elements thus provided are bridged by sheets of the fabric; the first sheet 26 bridges the two elements 23, 24 at one end of the body and extends down those sides of these elements which are further from each other, terminating on the base layer 25 of fabric. The second bridging sheet 27 starts at the vertex of the first element 24, bridges the vertices of elements 24, 23, 22 and extends down the further side of the element 22 onto the base layer 25. The third sheet 28 similarly starts at the vertex of the second element 23, bridges the vertices of elements 23, 22 and 21 and extends down the further side of the fourth element 21 onto the base layer 25, and so on. At each stage the resin is applied to the fabric. After the layers of fabric have been placed in position, they are left until the resin is cured, when a very strong rigid structure results.

As a result of this construction it will be seen that two complete separated layers of the resin-coated fabric are provided supported by reinforcing elements composed principally of the same material. With forms made of aluminium, these also contribute to the strength, but the bonding between the elements and the layers is very strong and with the natural strength of the material provides the substantial strength of the whole.

The size and spacing of the forms are chosen according to the requirements of the finished article but forms having a side ⅜″ wide and spaced 1″ apart have been found suitable. In this case, the sides of the elements are slit at ½″ intervals to enable them to be curved to the desired form. It is also possible to use very short lengths of the V-section channel material joined by a flexible member running along the underside of the vertex.

I claim:

1. A substantially rigid reinforced structure comprising a layer of reinforcing material curved in two planes, a plurality of elongated articulated hollow forms each consisting of endwise aligned substantially rigid hollow elements constituting consecutive sections of a single transversely notched channel member providing spaced side walls flexibly joined together at their ends, said forms being also curved in two planes to conform to said layer of reinforcing material, and at least one additional layer of reinforcing material having portions paralleling said first named layer, said forms being positioned between said first named layer and said additional layer and bonded to both of them.

2. A light weight double-skinned hollow-ribbed bending and torsion resistant curviform sheet-like structure comprising similar spaced layers of hardening resin impregnated fabric each conforming in shape to the superficial contour of said structure and connected by a plurality of laterally spaced conformable flexible sheet material channel shape stiffeners having integral lengthwise extending continuous median band portions and lengthwise discontinuous side walls integrally connected thereto with discontinuous flanges along their free edges substantially parallel to the median bands, said flanges and bands abutting against and constituting attaching means for said fabric layers, and hardening resin between said layers and attaching means adhering thereto and forming therewith a rigid composite internally stiffened structure suitable for the body of an article curved in two planes.

References Cited in the file of this patent

UNITED STATES PATENTS

| | | |
|---|---|---|
| 523,009 | Riddell | July 17, 1894 |
| 650,049 | Lynch | May 22, 1900 |
| 1,351,472 | Farmer | Aug. 31, 1920 |
| 2,077,513 | Buttress | Apr. 20, 1937 |
| 2,119,875 | Carl | June 7, 1938 |
| 2,369,892 | Greneker | Feb. 20, 1945 |
| 2,409,819 | Wilson | Oct. 22, 1946 |
| 2,412,731 | Hoffman | Dec. 17, 1946 |
| 2,426,058 | Scogland | Aug. 19, 1947 |
| 2,454,719 | Scogland | Nov. 23, 1948 |
| 2,477,852 | Bacon | Aug. 2, 1949 |
| 2,519,036 | Ford et al. | Aug. 15, 1950 |
| 2,549,189 | Gabo | Apr. 17, 1951 |
| 2,558,807 | Bailey | July 3, 1951 |
| 2,593,714 | Robinson | Apr. 22, 1952 |
| 2,644,777 | Havens | July 7, 1953 |
| 2,715,596 | Hawley | Aug. 16, 1955 |

FOREIGN PATENTS

| | | |
|---|---|---|
| 310,950 | Great Britain | Dec. 19, 1929 |
| 532,724 | Great Britain | Jan. 29, 1941 |
| 544,442 | Great Britain | Apr. 14, 1942 |
| 564,863 | Great Britain | Oct. 17, 1944 |
| 661,108 | Great Britain | Nov. 14, 1951 |